United States Patent [19]

Sano et al.

[11] Patent Number: 5,096,774

[45] Date of Patent: Mar. 17, 1992

[54] MAGNETIC RECORDING MEDIUM CONTAINING FERROMAGNETIC PARTICLES WITH SPECIFIED CRYSTALLITE SIZES AND WHEREIN THE RATIO OF CHLORINE TO IRON AT THE SURFACE IS WITHIN A SPECIFIED RANGE

[75] Inventors: Kunihiko Sano; Hiroaki Doushita; Kiyomi Ejiri; Hiroyuki Tahara, all of Kanagawa, Japan

[73] Assignee: Fuji Photo Film Co., Ltd., Kanagawa, Japan

[21] Appl. No.: 529,282

[22] Filed: May 29, 1990

[30] Foreign Application Priority Data

May 29, 1989 [JP] Japan .................................. 1-135175

[51] Int. Cl.$^5$ ................................................ G11B 5/00
[52] U.S. Cl. ..................................... 428/323; 428/329; 428/402; 428/409; 428/424.6; 428/425.8; 428/425.9; 428/694; 428/900
[58] Field of Search ............... 428/694, 900, 329, 402, 428/323, 424.6, 425.8, 425.9, 409

[56] References Cited

U.S. PATENT DOCUMENTS 4,888,212 12/1989 Iida et al. .......................... 427/130
4,904,530 2/1990 Huizing et al. ..................... 428/402

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium is disclosed, which comprises a non-magnetic support having thereon a magnetic layer comprising ferromagnetic fine particles and a binder containing a vinyl chloride polymer, wherein the crystalline size of the ferromagnetic fine particles is from 350 to 500 angstrom, the content of the vinyl chloride polymer is from 20 to 50% by weight based on the amount of the total binder, and an integrated intensity ratio $\alpha$ of the Cl-2P spectrum to the Fe-2P (3/2) spectrum at the surface of the magnetic layer measured by an X-ray photoelectron spectroscopy is $1.80/1 > \alpha > 0.50/1$.

13 Claims, No Drawings

MAGNETIC RECORDING MEDIUM CONTAINING FERROMAGNETIC PARTICLES WITH SPECIFIED CRYSTALLITE SIZES AND WHEREIN THE RATIO OF CHLORINE TO IRON AT THE SURFACE IS WITHIN A SPECIFIED RANGE

FIELD OF THE INVENTION

The present invention relates to a magnetic recording medium comprising a non-magnetic support having thereon a magnetic layer composed of ferromagnetic particles dispersed in a binder, and more particularly to a magnetic recording medium having excellent running property and durability, and causing less fast sticking on the surface of a magnetic head by rubbing the head surface with the magnetic layer during running of the magnetic recording medium.

BACKGROUND OF THE INVENTION

In general, a magnetic recording medium comprising a non-magnetic support having formed thereon a magnetic layer composed of ferromagnetic particles dispersed in a binder is used as magnetic recording media such as audio tapes, video tapes, computer tapes, etc.

In response to the recent demand for high density recording in magnetic recording media, it has been practiced to reduce the particle sizes of ferromagnetic fine particles, improve the dispersibility of ferromagnetic fine particles, improve the surface property of a magnetic layer, and improve the packing density of ferromagnetic fine particles.

For example, in order to improve the dispersibility of ferromagnetic fine particles, dispersing agents are used for preparing magnetic coating positions, and also it is recently proposed to improve the dispersibility of ferromagnetic fine particles by using a polyurethane resin containing a metal sulfonate and a vinyl chloride resin as a binder, namely by introducing polar groups into the binder, as described in JP-A-61-123017 (the term "JP-A" as used herein means as "unexamined published Japanese patent application").

Also, it is known to improve the surface property of the magnetic layer by increasing the temperature or pressure for a calendar treatment of a magnetic recording medium, and also improve the surface property of a magnetic recording medium by grinding the surface of the magnetic layer by a grinding tool, as described in JP-A-63-98834.

Furthermore, it is proposed to polish the surface of the magnetic layer by a polishing tape for providing a magnetic recording medium causing less clogging of a magnetic head and less occurrence of dropout in JP-A-63-259830.

It has been found that by the aforesaid improvements, the number of readily releasable particle components such as ferromagnetic particles from the surface of the magnetic layer is reduced to greatly decrease the occurrence of dropout and clogging of a magnetic head.

However, although the occurrence of dropout and clogging of magnetic head is reduced, fast sticking on magnetic head (i.e., components of a magnetic layer are locally fast-stuck on the surface of a video head during running of a magnetic recording tape to reduce the output) occurs and the phenomenon is particularly severe when the crystallite sizes of ferromagnetic fine particles are from 350 to 500 angstrom.

That is, a magnetic recording medium having improved electromagnetic conversion characteristics for high density recording generally tends to reduce the running property and durability thereof. In particular, the occurrence of the fast sticking phenomenon on magnetic head tends to become severe in a magnetic recording medium for high density recording.

In other words, it has been found that even by employing the aforesaid improving methods, a magnetic recording medium having improved running characteristics without causing fast sticking on magnetic head can not be obtained.

SUMMARY OF THE INVENTION

An object of the present invention is to provide a magnetic recording medium having an improved surface property of the magnetic layer, an improved packing density of ferromagnetic fine particles, and greatly excellent electromagnetic conversion characteristics by highly dispersing the ferromagnetic fine particles in a binder, without causing dropout and clogging of magnetic head and further without causing fast sticking on magnetic head.

Other objects and effects of the present invention will be apparent from the following description.

As the result of various investigations, the inventors have discovered that the aforesaid object can be attained by the present invention as set forth hereinbelow.

According to the present invention, there is provided a magnetic recording medium comprising a non-magnetic support having thereon a magnetic layer comprising ferromagnetic fine particles and a binder containing a vinyl chloride polymer, wherein the crystallite size of the ferromagnetic particles is from 350 to 500 angstrom, the content of the vinyl chloride polymer is from 20 to 50% by weight based on the amount of the total binder, and an integrated intensity ratio, which is denoted by $\alpha$, of the Cl-2P spectrum to the Fe-2P (3/2) spectrum at the surface of the magnetic layer measured by an X-ray photoelectron spectroscopy is $1.80/1 > \alpha > 0.50/1$.

The content of the vinyl chloride polymer is preferably from 25 to 45% by weight based on the amount of the total binder. The integrated intensity ratio $\alpha$ of Cl-2P spectrum to the Fe-2P (3/2) spectrum at the surface of the magnetic layer measured by an X-ray photoelectron spectroscopy is preferably $0.80/1 > \alpha > 0.51/1$.

In a preferred embodiment of the present invention, the vinyl chloride polymer contains at least one epoxy ring and at least one polar group selected from the group consisting of $-SO_3M$, $-OSO_3M$, $-PO_3M_2$, $-OPO_3M$, and $-CO_2M$ in the molecule (wherein M represents a hydrogen atom, an alkali metal, or ammonium).

DETAILED DESCRIPTION OF THE INVENTION

As the result of various investigations, the present inventors have discovered that the substance fast stuck on the surface of a magnetic head during running of a magnetic recording medium is ferromagnetic particles and it has been clarified that fast sticking on magnetic head is caused as follows. That is, the insufficiency of a binder at the surface of a magnetic layer causes an exposed portion of ferromagnetic fine particles without being sufficiently covered by the binder and such fine particles are fast stuck locally on the surface of the magnetic head during running of the magnetic recording medium.

The present inventors have also found a method of determining the ratio of a vinyl chloride polymer as a binder component to ferromagnetic fine particles at the surface of a magnetic layer by using an X-ray photoelectron spectroscopy. The present inventors have thus discovered that the occurrence of fast sticking on magnetic head has a close relation to the ratio of the vinyl chloride polymer as a binder component to ferromagnetic fine particles at the surface of the magnetic layer not to the ratio thereof in the whole magnetic layer, and the possibility of the occurrence of fast sticking on magnetic head is determined by the ratio of the vinyl chloride polymer as a binder component to the ferromagnetic fine particles at the surface of the magnetic layer. Also, it has been found that the ratio of the vinyl chloride polymer as a binder component to ferromagnetic fine particles at the surface of the magnetic layer can be controlled regardless of the ratio of the binder to the ferromagnetic fine particles in the whole magnetic layer.

That is, when the integrated intensity ratio $\alpha$ of the Cl-2P spectrum to the Fe-2P(3/2) spectrum at the surface of a magnetic layer (corresponding to the ratio of a vinyl chloride polymer as a binder component to ferromagnetic fine particles at the surface of the magnetic layer) of a magnetic recording medium measured by an X-ray photoelectron spectroscopy is not lower than 0.50/1, the ferromagnetic fine particles in the surface of the magnetic layer are not exposed even when the binder at the surface of the magnetic layer is scraped off by a magnetic head during running of the magnetic recording medium, thereby fast sticking on magnetic head during running of the magnetic recording medium does not occur.

Also, when the integrated intensity ratio $\alpha$ of the Cl-2P spectrum to the Fe-2P(3/2) spectrum at the surface of the magnetic layer measured by an X-ray photoelectron spectroscopy is higher than 1.80/1, the magnetic recording medium itself adheres to a cylinder of a video tape recorder during running thereof to give undesirable influences.

The Cl-2P spectrum and Fe-2P (3/2) spectrum mean 2P spectrum of Cl and 2P (3/2) spectrum of Fe as measured by X-ray photoelectron spectroscopy, respectively. With respect to the X-ray photoelectron spectroscopy, reference can be made to Thomas A. Carlson, *Photoelectron and Auger Spectroscopy*, p.3, PLENUM PRESS (1975).

The integrated ratio $\alpha$ of the magnetic recording medium of the present invention can be controlled by various factors such as the crystallite size of the ferromagnetic fine particles, the content of vinyl chloride in the binder, the stress of kneading which can be controlled by the amount of solvents used in the kneading step, and the surface abrading treatment of the magnetic recording medium. In the present invention the value $\alpha$ is controlled to fall within the above mentioned range by suitably selecting these conditions.

Examples of the ferromagnetic fine particles for use in the present invention include ferromagnetic alloy fine particles, ferromagnetic iron oxide fine particles, Co-doped ferromagnetic iron oxide fine particles, barium ferrite fine particles, etc. The effect of the present invention is particularly remarkable in the case of using ferromagnetic alloy fine particles for the magnetic recording medium. This is because that since the magnetic recording medium using such ferromagnetic alloy fine particles is excellent in the surface property of the magnetic layer and also the recording wavelength for the magnetic recording medium is short, the magnetic recording medium is more sensitive to the reduction of output by fast sticking on magnetic head.

The ferromagnetic alloy fine particles contain at least 75% by weight of metal component and at least 80% by weight of the metal component is a ferromagnetic metal such as Fe, Co, Ni, Fe-Ni, Co-Ni, and Fe-Co-Ni.

The acicular ratio (long axis/short axis) of the ferromagnetic alloy fine particles, ferromagnetic iron oxide fine particles, Co-doped ferromagnetic iron oxide fine particles or ferromagnetic chromium dioxide particles is generally from about 2/1 to 20/1, and preferably 5/1 or higher. The average particles length (in the long axis) of these ferromagnetic fine particles is generally about from 0.2 to 2.0 $\mu$m.

Also, the effect of the present invention is particularly remarkable when the crystallite size of the ferromagnetic fine particles is from 350 to 500 angstrom. The crystallite size referred herein is determined by an X-ray diffraction. In the present invention, however, when the crystallite size is larger than the aforesaid size, the running property and durability of the magnetic recording medium are effectively improved by using the technique of the present invention, and when the crystallite size is in the above range, the aforesaid properties are effectively improved.

The vinyl chloride polymer which can be used as a binder component for the magnetic recording medium of the present invention is a polymer containing vinyl chloride as a main monomer component, and examples thereof include a vinyl chloride/vinyl acetate copolymer, a vinyl chloride/vinyl propionate copolymer, a vinyl chloride/vinyl alcohol/maleic acid copolymer, a vinyl chloride/vinyl alcohol/acrylic acid copolymer, a vinyl chloride/vinylidene chloride copolymer, and a vinyl chloride/acrylonitrile copolymer.

The content of vinyl chloride in the vinyl chloride copolymer is preferably from 70 to 95 wt% based on the amount of the vinyl chloride copolymer.

The binder for use in this invention may further contain other resin in addition to the aforesaid polymer or copolymer. Examples of such a resin include an ethylene/vinyl acetate copolymer, cellulose derivatives (e.g., a nitrocellulose resin), an acrylic resin, a polyvinyl acetal resin, a polyvinyl butyral resin, an epoxy resin, a phenoxy resin, and a polyurethane resin.

In the aforesaid vinyl chloride polymers, vinyl chloride polymers such as a vinyl chloride/vinyl acetate copolymer, a vinyl chloride/vinyl propionate copolymer and a vinylidene chloride/vinyl acetate copolymer, which contain at least one epoxy ring and at least one polar group selected from $-SO_3M$, $-OSO_3M$, $-PO_3M_2$, $-OPO_3M_2$, and $-CO_2M$ (wherein M represents a hydrogen atom, an alkali metal, or ammonium) in the molecule are preferred. In these polar groups, $-SO_3M$ and $-CO_2M$ are preferred and $-SO_3M$ is more preferred.

The content of the polar group is about from $1\times10^{-7}$ to $1\times10^{-3}$ equivalent, and preferably from $1\times10^{-5}$ to $1\times10^{-4}$ equivalent per gram of the polymer. If the content thereof outside the aforesaid range, the dispersibility of ferromagnetic fine particles tends to be reduced and also the electromagnetic conversion characteristics tend to be reduced. The polymer may contain one or more kind of such polar groups.

Also, if the polymer further contains a hydroxy group, the dispersibility of ferromagnetic fine particles is more improved. The content of the hydroxyl group is preferably from $1 \times 10^{-4}$ to $1.5 \times 10^{-3}$ equivalent per gram of the polymer.

The content of the epoxy ring is preferably from $1 \times 10^{-4}$ to $1 \times 10^{-2}$ mole, and more preferably from $5 \times 10^{-4}$ to $5 \times 10^{-3}$ mole per gram of the polymer.

The weight average molecular weight of the vinyl chloride polymer is preferably from 20,000 to 100,000, and more preferably from 30,000 to 80,000. If the weight average molecular weight is outside the aforesaid range, the dispersibility of ferromagnetic fine particles tends to be reduced. The above polymers can be used alone or in combination thereof.

The binder may be subjected to a curing treatment by adding known isocyanate crosslinking agents (e.g., tolylene diisocyanate, tri-addition product of triethylolpropane). Furthermore, an acrylic acid ester oligomer and monomer may be added to the binder and may be cured by irradiation.

Other resins can be added to the above binder component. Examples of such resins include cellulose derivatives such as nitrocellulose resins, ethylene/vinyl acetate copolymers, acrylic resins, polyvinyl acetal resins, polyvinyl butyral resins, epoxy resins, phenoxy resins, and polyurethane resins.

In the present invention, polyurethane resins are preferably used with the vinyl chloride polymer, and polyester polyurethane resins, polyether polyurethane resins and polycarbonate polyurethane resins are particularly preferred. The polyurethane resins can be produced by reacting a polyol, a polyisocyanate and a branched crosslinking agent, and if desired a chain-extender, in a conventional manner.

Examples of polyols include polyether polyols, polyester polyols, polycarbonate polyols, and polycaprolactone diols. Representative polyether polyols are polyalkylene glycols such as polyethylene glycol, polypropylene glycol and polytetramethylene glycol. Polyester polyols can be produced, for example, by polycondensation of a dihydric alcohol such as glycols (e.g., ethylene glycol, propylene glycol, butanediol, 1,6-hexanediol and cyclohexanedimethanol) and a dibasic acid, (e.g., adipic acid, azelaic acid, sebacic acid, fumaric acid, itaconic acid, phthalic acid, isophthalic acid and terephthalic acid), open-chain polymerization of lactones (e.g., caprolactones), and the like. Preferred polycarbonate polyols include those having a molecular weight of 300 to 20,000 and a hydroxyl value of 20 to 300 which are synthesized, for example, by condensation or ester interchange reaction of phosgene, a chloroformate, a dialkyl carbonate or a diaryl carbonate with a polyhydric alcohol represented by formula (I):

$$HO-R^1-OH \quad (I)$$

wherein $R^1$ represents $-(CH_2)_n-$ (n=3 to 14),

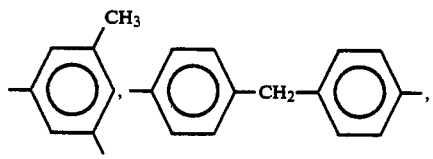

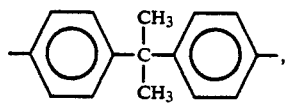

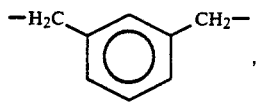

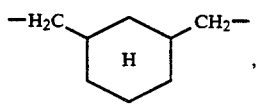

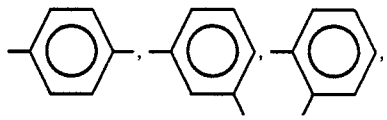

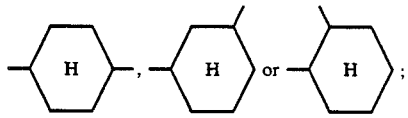

and polycarbonate polyester polyols having a molecular weight of 400 to 30,000 and a hydroxyl valve of 5 to 300 which are synthesized by condensation of the above polycarbonate polyols with a dibasic carboxyl acid represented by formula (II):

$$HOOC-R^2-COOH \quad (II)$$

wherein $R^2$ represents an alkylene group having 3 to 6 carbon atoms, 1,4-phenylene group, 1,3-phenylene group, 1,2-phenylene group, 1,4-cyclohexylene group, 1,3-cyclohexylene group, or 1,2-cyclohexylene group. Polyesterether polyols and polyesters may be compounded together with the above polyols in an amount of 90% by weight or less based on the weight of the polyols.

Polyisocyanates which are reacted with the polyols are not particularly limited, and those conventionally used for the production of polyurethane resins can be used, such as hexamethylene diisocyanate, tolylene diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, 4,4-diphenylmethane diisocyanate, 3,3-dimethylphenylene diisocyanate, and dicyclohexylmethane diisocyanate.

For the branched crosslinking agent, there may be mentioned polyhydric alcohols having three or more functional groups, such as trimethylolpropane, glycerol, hexanetriol, triethanolamine, diglycerol, pentaerythritol, sorbitol, dipentaerythritol, ethylene oxide or propylene oxide adducts of the above compounds, and propylene oxide adducts of ethylenediamine. Of the branched crosslinking agents, those having three hydroxyl groups per molecule are preferred, such as trimethylolpropane and glycerol. The amount of the branched crosslinking agent is generally from 0.1 to 1 mmol per 1 g of polyurethane resins. If the amount is more than 1 mmol/g, solubility of the resulting polyurethane resins is reduced. If it is less than 0.1 mmol/g, properties of the resins are deteriorated with respect to dispersibility, durability and calendering contamination.

While the above-mentioned polyhydric alcohols may function as a chain extender, aliphatic polyamines, alicyclic polyamines and aromatic polyamines may also be used for the purpose.

In the binder as described above, conventional isocyanate type crosslinking agents may be added as a binder component to cure the binder. The isocyanate type crosslinking agents used in the present invention are polyisocyanate compounds having two or more isocyanate groups, such as isocyanates (e.g., tolylene diisocyanate, 4,4'-diphenylmethane diisocyanate, hexamethylene diisocynate, xylylene diisocyanate, naphthylene-1,5-diisocyanate, o-toluidine diisocyanate, isophorone diisocyanate, triphenylmethane diisocyanate, reaction products of these isocyanates and polyols (e.g., an adduct of three mol of tolylene diisocyanate and one mol of trimethylolpropane), and polyisocyanates produced by condensation of these isocyanates. These polyisocyanate compounds are commercially available under the trade marks, Coronate L, Coronate HL, Coronate H, Coronate EH, Coronate 2014, Coronate 2030, Coronate 2031, Coronate 2036, Coronate 3015, Coronate 3040, Coronate 3041, Millionate MR, Millionate MTL, Daltosec 1350, Daltosec 2170 and Daltosec 2280 (produced by Nippon Polyurethane Co., Ltd.), Takenate D102, Takenate D110N, Takenate D200 and Takenate D202 (produced by Takeda Pharmaceutical Industries Co., Ltd.), Sumidur N75 (produced by Sumitomo Bayer Co., Ltd.), Desmodur L, Desmodur IL, Desmodur N and Desmodur HL (produced by Bayer A.G.), and Barnok D850 and Barnok D802 (produced by DAINIPPON INK AND CHEMICAL INC). Acrylic ester oligomers and acrylic ester monomers may also be added as a binder component to make the binder curable by irradiation.

A preferred binder used in the present invention comprises a vinyl chloride polymer, a polyurethane resin, and a curing agent such as the isocyanate type crosslinking agents, wherein the vinyl chloride polymer, the polyurethane resin and the curing agent are contained in amounts of 20 to 50 parts by weight, 20 to 50 parts by weight and 10 to 40 parts by weight, respectively, based on 100 parts by weight of the total amount of the three components.

The content of the total binders in the magnetic layer of the magnetic recording medium of the present invention is generally from 10 to 100 parts by weight, and preferably from 20 to 40 parts by weight, per 100 parts by weight of the ferromagnetic fine particles in the layer.

A preferred method of producing the magnetic recording medium of this invention using the aforesaid ferromagnetic fine particles, the binder, etc., is described below in detail.

Since ferromagnetic fine particles are in a secondary aggregated state due to their own magnetism, it is preferred to mechanically pulverize the aggregated particles. The introduction of the pulverizing step can shorten the time for the succeeding kneading step.

The pulverizing step can be conducted using a simple mill (manufactured by Shinto Kogyo Co., Ltd.), a sand mill (manufactured by Matsumoto Chuzo Kogyo Co., Ltd.), a sand grinder, a double roll mill, a triple roll mill, an open kneader, a pressure kneader, a continuous kneader, a Henschel mixer, etc. It is preferred that the pulverizing step is conducted using the same apparatus as that used in the succeeding kneading step since a transfer step of the pulverized ferromagnetic particles can be omitted.

In a kneading step, the aforesaid binder, the ferromagnetic particles and a solvent are first kneaded by the aforesaid roll mill or kneader, and then they are dispersed. At the dispersing step, a sand mill, a ball mill, an attritor, a Henschel mixer, etc., can be used. The binder may be added as a solution dissolved in the solvent or may be added separately from the solvent.

The magnetic coating composition in this invention may further contain a lubricant. Examples of the lubricant include fatty acid having from 12 to 24 carbon atoms, fatty acid esters (e.g., various monoesters, sorbitan fatty acid esters, glycerol fatty acid esters, polybasic acid esters, etc.), fatty acid amides, metallic soaps, higher aliphatic alcohols, monoalkyl phosphates, dialkyl phosphates, trialkyl phosphates, paraffins, silicone oils, fatty acid-denatured silicone compounds, fluorine oils, esters having a perfluoroalkyl group, silicone compounds having a perfluoroalkyl group, animal oils, vegetable oils, mineral oils, higher aliphatic amines, and inorganic fine particles (e.g., graphite, silica, molybdenum disulfide, tungsten disulfide). Among these lubricants, fatty acids having from 14 to 22 carbon atoms, fatty acid amides having from 14 to 22 carbon atoms, fatty acid esters having from 22 to 36 carbon atoms, esters having a perfluoroalkyl group having 6 or more carbon atoms, and silicone compounds having a perfluoroalkyl group having 6 or more carbon atoms are preferred.

Furthermore, the magnetic coating composition in this invention may further contain additives such as abrasive, dispersing agents, antistatic agents, rust preventives, etc.

There is no particular restriction on the abrasive for use in this invention if the Moh's hardness of the abrasive is at least 5, and preferably at least 8. Examples of the abrasive having a Moh's hardness of at least 5 include $Al_2O_3$ (Moh's hardness: 9), TiO (Moh's hardness 6), $TiO_2$ (Moh's hardness: 6), $SiO_2$ (Moh's hardness: 7), $SnO_2$ (Moh's hardness: 6.5), $Cr_2O_3$ (Moh's hardness: 9), and $\alpha$-$Fe_2O_3$ (Moh's hardness: 5.5). They can be used singly or as a mixture thereof. Abrasive having a Moh's hardness of at least 8 are particularly preferred in this invention. When an abrasive having a Moh's hardness of lower than 5 is used, the abrasive is liable to drop off from the magnetic layer to reduce the running durability of the magnetic recording medium.

The content of the abrasive is generally in the range of from 0.1 to 20 parts by weight, and preferably in the range of from 1 to 10 parts by weight, per 100 parts by weight of the ferromagnetic fine particles.

As the antistatic agent, carbon black, particularly that having a mean grain size of from 10 to 300 nm, is preferably used in the present invention.

Examples of an organic solvent which is used for preparing the magnetic coating composition by kneading and dispersing the above-described mixture and for coating the coating composition include ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; ethers such as ethyl ether, glycol dimethyl ether, glycol monoethyl ether, dioxane, tetrahydrofuran, etc.; aromatic hydrocarbons such as benzene, toluene, xylene, etc; and chlorinated hydrocarbons such as methylene chloride, ethylene chloride, carbon tetrachloride, chloroform, ethylene chlorohydrin, dichlorobenzene, etc.

The magnetic recording medium of the present invention may be subjected to a surface treatment such as calendaring treatment after drying, and may further be subjected to a surface abrading treatment. The abrading treatment can be carried out by using a single-edged razor blade, an abrasive tape, a fixed blade, a diamond wheel, a rotary blade or the like. It is preferred that the abrasion be done by moving an abrasive tape or a rotary blade in a direction opposite to the direction to which the magnetic layer proceeds. When an abrasive tape is used, it is preferably moved at a speed of 1 to 3 cm/min with respect to the magnetic layer.

Examples of the material for the support on which the magnetic coating composition is coated include polyesters such as polyethylene terephthalate, polyethylene 2,6-naphthalate, etc.; polyolefins such as polyethylene, polypropylene, etc.; cellulose derivatives such as cellulose triacetate, etc.; plastics such as polycarbonate, polyimide, polyamide imide, etc.; as well as, according to uses, non-magnetic metals such as aluminum, copper, tin, zinc, non-magnetic alloys of these metals, etc.; and plastics vapor-deposited with a metal such as aluminum.

The thickness of the support is generally from 3 to 100 $\mu$m, preferably from 3 to 20 $\mu$m, for magnetic recording tapes, and generally from 20 to 100 $\mu$m for magnetic recording disks.

The form of the support may be films, tapes, sheets, disks, cards, drums, etc., and various materials are selectively used according to the form of support.

Furthermore, in this invention a backing layer may be formed on the opposite surface of the support for static prevention, for preventing the occurrence of wow and flutter, for improving the strength of the magnetic recording medium, and for matting the back surface of the support.

In this invention, since ferromagnetic fine particles of the crystallite size of from 350 to 500 angstrom are used, a vinyl chloride polymer is used as a main component of the binder of the magnetic layer, and the integrated intensity ratio $\alpha$ of the Cl-2P spectrum to the Fe-2P(3/2) spectrum at the surface of the magnetic layer measured by an X-ray photoelectron spectroscopy is $1.80/1 > \alpha > 0.50/1$, the occurrence of fast sticking on magnetic head and the occurrence of adhering on a cylinder are remarkably prevented. This is because the vinyl chloride polymer which is the main binder component for ensuring the durability of the magnetic recording medium firmly covers the ferromagnetic fine particles at the surface of the magnetic layer.

That is, the occurrence of fast sticking on magnetic head is caused by ferromagnetic fine particles uncovered by a binder and, on the other hand, if the amount of a binder at or in the surface of a magnetic layer is too large, the excessive binder increases the tackiness of the surface of the magnetic layer to cause the phenomenon of adhering the magnetic recording medium onto the cylinder of a video tape recorder.

In this invention, by controlling the integrated intensity ratio $\alpha$ of the Cl-2P spectrum based on the vinyl chloride polymer to the Fe-2P(3/2) spectrum based on the ferromagnetic fine particles at the surface of the magnetic layer as the aforesaid range, the vinyl chloride polymer properly cover the ferromagnetic fine particles at the surface of the magnetic layer, whereby the requirement of not causing fast sticking on magnetic head while 50 pass running and the requirement of not causing adhering on a cylinder, which conflict with each other, are simultaneously satisfied.

The following examples are intended to illustrate the present invention practically but not to limit it in any way. In addition, all parts in these examples are by weight.

EXAMPLE 1

In an open kneader were pulverized 100 parts of ferromagnetic alloy fine particles (composition: Fe 94%, Zn 4%, and Ni 2%, Hc: 1,500 Oe, crystallite size: 350 Å) for 10 minutes, and the ferromagnetic alloy fine particles were mixed and kneaded with 12 parts (46% by weight to the total binder of a compound ($SO_3Na=6 \times 10^{-5}$ eq/g, epoxy equivalent $= 10^{-3}$ eq/g, molecular weight $=50,000$) formed by adding a sodium salt of hydroxyethyl sulfonate to a copolymer of vinyl chloride/vinyl acetate/glycidyl methacrylate (86/9/5 by weight ratio) and 40 parts of methyl ethyl ketone for 60 minutes.

Then, to the kneaded mixture were added 8 parts (as solid component) of a $SO_3Na$-containing urethane resin (UR 8200, trade name, made by Toyobo Co., Ltd.), 5 parts of a lubricant ($Al_2O_3$, grain size 0.3 $\mu$m), 2 parts of carbon black (particle size 40 m$\mu$), and 200 parts of a methyl ethyl ketone/toluene mixture (1/1 by weight ratio) followed by dispersing for 120 minutes using a sand mill.

To the dispersion was further added 6 parts (as solid content) of polyisocyanate (Coronate 3041, trade name, made by Nippon Polyurethane Co., Ltd.), 1 part of stearic acid, 2 parts of butyl stearate, and 50 parts of methyl ethyl ketone and after stirring and mixing them for 20 minutes, and mixture was filtered using a filter having a mean pore size of 1 $\mu$m to provide a magnetic coating composition.

The coating composition thus prepared was coated on the surface of a polyethylene terephthalate film support having a thickness of 10 $\mu$m at a dry thickness of 3.5 $\mu$m using a reverse roll.

The non-magnetic support having the coated layer of the magnetic coating composition was subjected to a magnetic orientation by magnets of 3,000 gauss while the coated layer of the magnetic coating composition was in undried state. Then, after drying the coated layer, the magnetic recording medium was subjected to a super calendar treatment, slit to 8 mm width, and polished by an abrasive tape (as disclosed in JP-A-63-259830) to provide an 8 mm video tape.

EXAMPLE 2

By following the same procedure as Example 1 except that 60 parts of methyl ethyl ketone was used at kneading the magnetic coating composition, an 8 mm video tape was prepared.

EXAMPLE 3

By following the same procedure as Example 1 except that a copolymer of vinyl chloride/vinyl acetate/glycidyl methacrylate (86/9/5 by weight ratio) was used in place of the copolymer in Example 1, an 8 mm video tape was prepared.

EXAMPLE 4

By following the same procedure as Example 2 except that a copolymer of vinyl chloride/vinyl acetate/glycidyl methacrylate (86/9/5 by weight ratio) was used in place of the copolymer in Example 1, an 8 mm video tape was prepared.

EXAMPLE 5

By following the same procedure as Example 2 except that Co-doped α-iron oxide fine particles (Hc: 900 Oe, crystallite size 480 angstrom) were used as the ferromagnetic fine particles, a ½ inch video tape was prepared.

COMPARATIVE EXAMPLE 1

By following the same procedure as Example 1 except that 30 parts of methyl ethyl ketone was used at kneading the magnetic coating composition, an 8 mm video tape was prepared.

COMPARATIVE EXAMPLE 2

By following the same procedure as Example 1 except that 80 parts of methyl ethyl ketone was used at kneading the magnetic coating composition, an 8 mm video tape was prepared.

COMPARATIVE EXAMPLE 3

By following the same procedure as Example 1 except that 30 parts of methyl ethyl ketone was used at kneading the magnetic coating composition, an 8 mm video tape was prepared.

EXAMPLE 6

By following the same procedure as Example 3 except that 6 parts (24% by weight to the total binder) of the vinyl chloride copolymer was used in place of 12 parts of the copolymer, 12 parts of the $SO_3Na$-containing polyurethane resin was used in place of 8 parts of the resin, and 8 parts of polyisocyanate was used in place of 6 parts thereof, an 8 mm video tape was prepared.

COMPARATIVE EXAMPLE 4

By following the same procedure as Comparative Example 2 except that 4 parts (15% by weight to the total binder) of the vinyl chloride copolymer was used in place of 12 parts of the copolymer, 12 parts of the $SO_3Na$-containing polyurethane resin was used in place of 8 parts of the resin, and 10 parts of polyisocyanate was used in place of 6 parts thereof, an 8 mm video tape was prepared.

COMPARATIVE EXAMPLE 5

By following the same procedure as Example 1 except that 14 parts (55% by weight to the total binder) of the vinyl chloride copolymer was used in place of 12 parts of the copolymer, 7 parts of the $SO_3Na$-containing polyurethane resin was used in place of 8 parts of the resin, and 5 parts of polyisocyanate was used in place of 6 parts of polyisocyanate, an 8 mm video tape was prepared.

The evaluation results of each of the video tapes thus prepared are shown in Table 1 below.

TABLE 1

| Sample | α | Fast Sticking on Head | Adhering to Cylinder |
|---|---|---|---|
| Example 1 | 0.51/1 | A | A |
| Example 2 | 0.75/1 | A | A |
| Example 3 | 0.98/1 | B | A |
| Example 4 | 1.24/1 | B | A |
| Example 5 | 1.52/1 | B | A |
| Comparative Example 1 | 0.43/1 | C | A |
| Comparative Example 2 | 1.81/1 | A | C |
| Comparative Example 3 | 0.49/1 | C | A |
| Example 6 | 0.65/1 | C | A |
| Comparative Example 4 | 0.59/1 | C | A |
| Comparative Example 5 | 0.62/1 | A | C |

α: An integrated intensity ratio of Cl-2P spectrum to Fe-2P(3/2) spectrum measured by an X-ray photoelectron spectroscopy The test results shown in the above table were evaluated as follows.

Evaluation Method of Fast Sticking on Head

Each of the video tapes thus prepared was loaded on a VTR (FUJIX-8 trade name, made by Fuji Photo Film Co., Ltd.), and the tape of the whole length (120 minutes running) was run repeatedly at 50 passes under the condition of 20° C., 10%RH and the reduction of output was determined.

The surface of the magnetic head after running was observed by an optical microscope, whereby the occurrence of fast sticking on the surface was determined.

The video tape in Example 5 was slit to a ½ inch width and the same test as above was performed using a VTR for S-VHS (AG 6200, trade name, made by Matsushita Electric Industrial Co., Ltd.).

The grades of the evaluations are as follows.
A: Neither fast sticking on head nor reduction of output were observed.
B: Fast sticking on head was observed but the output was not reduced.
C: Fast sticking on head was observed and the output was reduced.

Evaluation of Adhering to Cylinder

Each of the video tapes thus prepared was loaded on a VTR (FUJIX-8, trade name, made by Fuji Photo Film Co., Ltd.), and after storing it for 24 hours under the condition of 40° C., 80%RH, the running state of each tape was determined. Also, the sample in Example 5 was slit to a ½ inch width and the running state was determined using a VTR for S-VHS (AG 6200, trade name, made by Matsushita Electric Industrial Co., Ltd.).

The grades of the evaluations are as follows.
A: No abnormality was observed in running.
C: Tape adhered to a cylinder to stop running.

Measurement Method of α

An X-ray photoelectron spectrometer (PHI-560, trade name, made by Perkin-Elmar Co.) was used. An Mg anode was used as the X-ray source and the measurement was conducted at 300 W. First, after washing away the lubricant of the video tape with n-hexane, the video tape was mounted on the X-ray photoelectron spectrometer. The distance between the X-ray source and the sample video tape was 1 cm.

After degassing the sample under vacuum for 5 minutes, the Cl-2P spectrum and the Fe-2P(3/2) spectrum were measured by integrating them for 10 minutes. The pass energy was kept at a constant value of 100 eV.

The integrated intensity ratio α of the Cl-2P spectrum to the Fe-2P(3/2) spectrum measured was determined by calculation.

As is clear from the result shown in Table 1, each of the samples in Examples 1 to 6, wherein $1.80/1 > \alpha > 0.51/1$ which is the range of this invention, fast sticking on head does not occur or even if it occurs, the output is not reduced and also no abnormal running is observed due to adhering to a cylinder.

On the other hand, when the value $\alpha$ is outside the aforesaid range defined in this invention, that is, when the value $\alpha$ is 1.81/1 as in Comparative Example 2, fast sticking on head occurs and when the value $\alpha$ is 0.43/1 as in Comparative Example 1, adhering to a cylinder occurs.

When the content of the vinyl chloride copolymer which is the main binder component is from 20 to 50% by weight of the total binder and the value $\alpha$ is within the aforesaid range defined in this invention, neither fast sticking on head nor adhering to cylinder occur.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising an non-magnetic support having thereon a magnetic layer comprising ferromagnetic fine particles and a binder containing a vinyl chloride polymer, wherein the crystallite size of said ferromagnetic fine particles is from 350 to 500 angstrom, the content of said vinyl chloride polymer is from 20 to 50% by weight based on the amount of the total binder, and an integrated intensity ratio $\alpha$ of the Cl-2P spectrum to the Fe-2P (3/2) spectrum at the surface of said magnetic layer measured by an X-ray photoelectron spectroscopy is $1.80/1 > \alpha > 0.50/1$.

2. A magnetic recording medium as claimed in claim 1, wherein said vinyl chloride polymer contains at least one epoxy ring and at least one polar group selected from the group consisting of $-SO_3M$, $-OSO_3M$, $-PO_3M$, $-OPO_3M$ and $-CO_2M$, wherein M represents a hydrogen atom, an alkali metal or ammonium, in the molecule.

3. A magnetic recording medium as claimed in claim 1, wherein the content of said vinyl chloride polymer is from 25 to 45% by weight based on the amount of the total binder.

4. A magnetic recording medium as claimed in claim 1, wherein an integrated intensity ratio $\alpha$ of the Cl-2P spectrum to the Fe-2P (3/2) spectrum at the surface of said magnetic layer measured by an X-ray photoelectron spectroscopy is $0.80/1 > \alpha > 0.51/1$.

5. A magnetic recording medium as claimed in claim 1, wherein said ferromagnetic fine particles are selected from the group consisting of ferromagnetic alloy fine particles, ferromagnetic iron oxide fine particles, Co-doped ferromagnetic iron oxide fine particles, and barium ferrite fine particles.

6. A magnetic recording medium as claimed in claim 5, wherein said ferromagnetic fine particles are ferromagnetic alloy fine particles.

7. A magnetic recording medium as claimed in claim 1, wherein said ferromagnetic particles have an acicular ratio of about 2/1 to 20/1 and an average particles length of about 0.2 to 2.0 μm.

8. A magnetic recording medium as claimed in claim 7, wherein said acicular ratio is 5/1 or more.

9. A magnetic recording medium as claimed in claim 1, wherein said vinyl chloride polymer is selected from the group consisting of a vinyl chloride/vinyl acetate copolymer, a vinyl chloride/vinyl propionate copolymer, a vinyl chloride/vinyl alcohol/maleic acid copolymer, a vinyl chloride/vinyl alcohol/acrylic acid copolymer, a vinyl chloride/vinylidene chloride copolymer, and a vinyl chloride/acrylonitrile copolymer.

10. A magnetic recording medium as claimed in claim 2, wherein the content of said polar group is from $1 \times 10^{-7}$ to $1 \times 10^{-3}$ equivalent per gram of said vinyl chloride polymer.

11. A magnetic recording medium as claimed in claim 2, wherein the content of said epoxy ring is from $1 \times 10^{-4}$ to $1 \times 10^{-2}$ equivalent per gram of said vinyl chloride polymer.

12. A magnetic recording medium as claimed in claim 1, wherein the weight average molecular weight of said vinyl chloride polymer is from 20,000 to 100,000.

13. A magnetic recording medium as claimed in claim 1, wherein said binder comprises from 20 to 50 parts by weight of said vinyl chloride polymer, from 20 to 50 parts by weight of a polyurethane resin, and from 10 to 40 parts by weight of a curing agent, based on 100 parts by weight of the total amount of said binder.

* * * * *